(12) United States Patent
Hsu (10) Patent No.: US 11,381,097 B2
(45) Date of Patent: Jul. 5, 2022

(54) DOCKING DEVICE AND CHARGING MANAGEMENT METHOD THEREOF

(71) Applicant: BIZLINK INTERNATIONAL CORPORATION, New Taipei (TW)

(72) Inventor: Ming-Tso Hsu, Taipei (TW)

(73) Assignee: BIZLINK INTERNATIONAL CORPORATION, New Taipei (TW)

( * ) Notice: Subject to any disclaimer, the term of this patent is extended or adjusted under 35 U.S.C. 154(b) by 231 days.

(21) Appl. No.: 16/898,554

(22) Filed: Jun. 11, 2020

(65) Prior Publication Data

US 2020/0395772 A1    Dec. 17, 2020

(30) Foreign Application Priority Data

Jun. 13, 2019 (TW) ................................ 108120557

(51) Int. Cl.
*H02J 7/00* (2006.01)
*G06F 13/40* (2006.01)
(Continued)

(52) U.S. Cl.
CPC ............ *H02J 7/0045* (2013.01); *G01K 3/005* (2013.01); *G01K 7/00* (2013.01); *G06F 13/4022* (2013.01);
(Continued)

(58) Field of Classification Search
CPC ............... H02J 7/0045; H02J 7/007192; H02J 2207/20; H02J 2207/30; H02J 1/14;
(Continued)

(56) References Cited

U.S. PATENT DOCUMENTS 8,754,616 B2    6/2014  Dhuyvetter et al.
9,748,788 B2    8/2017  Sporck et al.
(Continued)

FOREIGN PATENT DOCUMENTS

CN    101147312 A    3/2008
CN    102063169 A    5/2011
(Continued)

*Primary Examiner* — Stacy Whitmore
(74) *Attorney, Agent, or Firm* — Alan D. Kamrath; Karin L. Williams; Mayer & Williams PC (57) ABSTRACT

The invention discloses a docking device and a charging management method thereof, including a first connection port, a second connection port, at least one peripheral equipment connection port, a power converter, a temperature sensor and a processor. The first connection port and the second connection port are both USB Type-C connectors, connected to a host and an external power respectively. When a real temperature value sensed by the temperature sensor rises to an upper temperature threshold, the processor controls the first connection port, the second connection port, and the peripheral equipment connection port coordinately according to USB-C power delivery protocol, requests an input voltage of the second connection port to be equal to the peripheral device voltage, and transmits the input voltage to the peripheral equipment connection port via the power converter. Neither does the power converter generate conversion loss nor does the docking device increase power loss and heat.

16 Claims, 7 Drawing Sheets

(51) Int. Cl.
*G06F 13/42* (2006.01)
*G01K 3/00* (2006.01)
*G01K 7/00* (2006.01)

(52) U.S. Cl.
CPC .... *G06F 13/4282* (2013.01); *H02J 7/007192* (2020.01); *G06F 2213/0042* (2013.01); *H02J 2207/20* (2020.01)

(58) Field of Classification Search
CPC ........... H02J 7/007; G01K 3/005; G01K 7/00; G06F 13/4022; G06F 13/4282; G06F 2213/0042; G06F 1/266; G06F 1/263; G06F 11/3058; Y02D 10/00
See application file for complete search history.

(56) References Cited

U.S. PATENT DOCUMENTS

| | | | |
|---|---|---|---|
| 9,904,338 B2 | 2/2018 | Wu et al. | |
| 9,979,214 B2 | 5/2018 | Yang et al. | |
| 10,186,966 B2 | 1/2019 | Unru et al. | |
| 10,489,324 B2 | 11/2019 | Sporck et al. | |
| 10,860,074 B2 * | 12/2020 | Kuroi | G06F 1/266 |
| 2008/0212345 A1 | 9/2008 | Yamashita et al. | |
| 2017/0155263 A1 | 6/2017 | Chen et al. | |
| 2017/0207648 A1 | 7/2017 | Xiao | |
| 2017/0222465 A1 * | 8/2017 | Hawley | H02J 7/0072 |
| 2017/0277251 A1 * | 9/2017 | Gong | G06F 1/28 |
| 2017/0346240 A1 * | 11/2017 | Oporta | G06F 13/4022 |
| 2017/0364114 A1 * | 12/2017 | Sporck | H02J 7/0071 |
| 2018/0097385 A1 * | 4/2018 | Li | H02J 7/00 |
| 2019/0033953 A1 * | 1/2019 | Kadgi | G06F 13/4282 |
| 2019/0089190 A1 | 3/2019 | Yang et al. | |
| 2019/0138072 A1 * | 5/2019 | Kuroi | G06F 1/266 |

FOREIGN PATENT DOCUMENTS

| | | | |
|---|---|---|---|
| CN | 202652067 U | 1/2013 | |
| CN | 205123576 U | 3/2016 | |
| CN | 105830324 A | 8/2016 | |
| CN | 106505660 A | 3/2017 | |
| CN | 106961210 A | 7/2017 | |
| CN | 108124497 A | 6/2018 | |
| CN | 108880239 A | 11/2018 | |
| CN | 109491493 A | 3/2019 | |
| EP | 3043442 A1 * | 7/2016 | G06F 1/26 |
| TW | 201527963 A | 7/2015 | |
| TW | 201530319 A | 8/2015 | |
| TW | 201913401 A | 4/2019 | |

* cited by examiner

DOCKING DEVICE AND CHARGING MANAGEMENT METHOD THEREOF

BACKGROUND OF THE INVENTION

1. Field of the Invention

The invention relates to a docking device, particularly to a USB-C docking device and a charging management method thereof.

2. Description of the Related Art

With reducing size and thickness of the notebook or the tablet, the amount of the connection port arranged in the computer is reduced subsequently. Therefore, according to demands, the user needs to purchase extra various adaptors or connecting cables and so on. Even manufacturers develop a portable docking device with multiple functions for the user to connect the computer and various devices simply. The docking device can integrate connection ports with various interface standards. The user can utilize a single docking device to replace most adaptors or connecting cables.

There is usually a DC to DC power convertor circuit disposed in the docking device. The power convertor circuit can convert power from a power source to an appropriate voltage value so as to provide the appropriate voltage to a power sink device connected to the connection ports. However, the converting efficiency of the power convertor circuit is usually not excellent. Since the power loss will be converted to heat to dissipate in a condition of the higher conversion loss, a temperature of the docking device will gradually rise, and even a surface of the docking device is overheated, affecting the utilization of the docking device by the user. In an extreme situation, the user may be scalded by the surface of the docking device.

The existing method for dissipating heat of the docking device is achieved by the design in structure such as to dispose heat sinks in the docking device, to expand a thermal convection space, and to increase ventilation pores. However, in this way, the size of the docking device will be expanded to occupy more space. Therefore, the method cannot facilitate the user to use the docking device and cost will increase subsequently after adding the heat sinks.

SUMMARY OF THE INVENTION

Since the existing docking device has low power conversion efficiency that induces the problem of high operating temperature, the invention provides a docking device and a charging management method thereof to tackle this shortcoming. While the operating temperature of the existing docking device is too high, the existing docking device can automatically switch the operating mode to lower temperature without large-sized heat sinks.

To achieve the above purposes, the docking device of the invention includes:

a first connection port, connected to a host to provide a host voltage to the host; wherein the first connection port is a USB Type-C connector;

a second connection port, connected to an external power to obtain an input voltage; wherein the second connection port is a USB Type-C connector;

at least one peripheral equipment connection port, connected to a peripheral device to provide a peripheral device voltage to the peripheral device;

a power converter, connected to the first connection port, the second connection port, and the at least one peripheral equipment connection port;

a temperature sensor, sensing a temperature in the docking device to output a real temperature value;

a processor, controlling the first connection port, the second connection port, and the at least one peripheral equipment connection port coordinately according to the USB-C power delivery protocol, receiving the real temperature value, determining whether the real temperature value is greater than or equal to an upper temperature threshold, and if yes, performing a cooling charging mode, requesting that the input voltage of the second connection port is equal to the peripheral device voltage, and controlling the input voltage to be transmitted to the at least one peripheral equipment connection port via the power converter.

The invention is performed by comparing a predetermined upper temperature threshold with a real temperature value. When the operating temperature in the device reaches the upper temperature threshold, the processor of the device automatically controls the input voltage of the second connection port equal to the peripheral device voltage, and directly transmits the input voltage to the peripheral device without being converted by the power converter. Therefore, neither does the power converter generate conversion loss nor does the docking device increase power loss and heat. Hence, the operating temperature in the docking device is gradually lowered so that the docking device can avoid being damaged by high temperature.

DETAILED DESCRIPTION OF THE INVENTION

Figure 1:
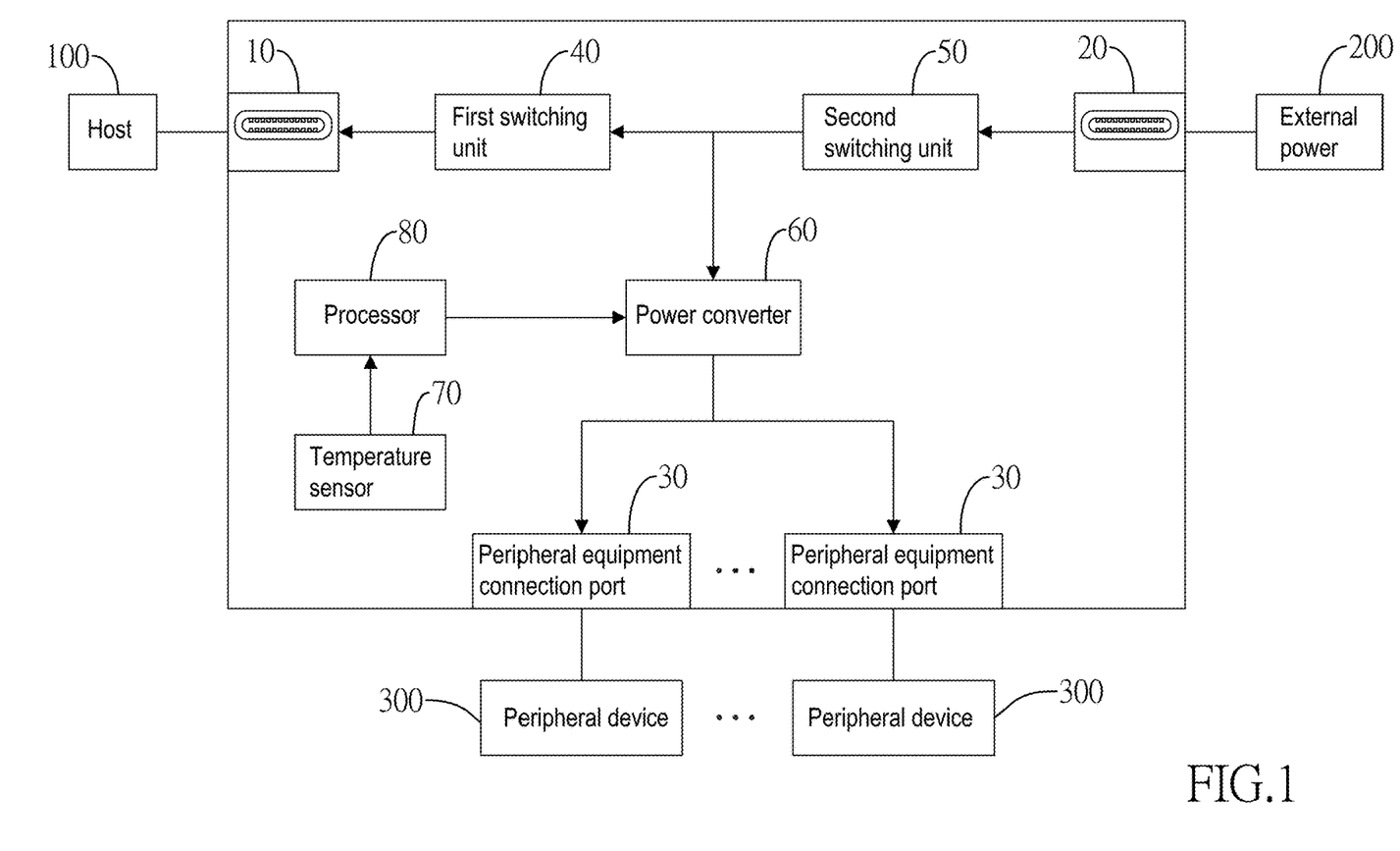
FIG. 1 is the circuit block diagram of the docking device of the invention.

Please refer to FIG. 1. FIG. 1 is the circuit block diagram of the docking device of the invention. First of all, the docking device includes a first connection port 10, a second connection port 20, at least one peripheral equipment connection port 30, a first switching unit 40, a second switching unit 50, a power converter 60, a temperature sensor 70, and a processor 80. In the embodiment, the docking device includes a plurality of peripheral equipment connection ports 30.

The first connection port 10 is a USB Type-C (hereinafter called USB-C) connection port, for being connected to a host 100. For instance, the host 100 can be a notebook.

The second connection port 20 is a USB-C connection port, for being connected to an external power 200. The external power 200 is a USB-C device capable of providing power, or is a power adapter.

The standards of the peripheral equipment connection port 30 are various. The at least one peripheral equipment connection port 30 includes a USB-C connection port, or another connection port, such as USB 2.0, USB 3.0, USB 3.1, or video connection ports such as Display Port 1.2, Display Port 1.4, HDMI 1.4, HDMI 2.0, VGA and so on, or Internet connection port, or audio connection port and so on. Each peripheral equipment connection port 30 is utilized to be connected to a peripheral device. For example, the peripheral device is a mobile phone, a tablet, a video equipment, an internet communication equipment, and an audio equipment, etc.

The first switching unit 40 is connected to the first connection port 10 to control whether power is inputted to the docking device via the first connection port 10. The first switching unit 40 is an element having low conducting resistance such as an MOS transistor having a conducting resistance $R_{DS}$ being approximately 10 mg. The second switching unit 50 is connected to the second connection port 20 to control whether power is inputted to the docking device via the second connection port 20, or to control power to be outputted to an external via the second connection port 20. The second switching unit 50 is an element having low conducting resistance, such as a MOSFET transistor having a conducting resistance $R_{DS}$ being approximately 10 mΩ-30 mΩ.

The power converter 60 has an input side and an output side. The input side is connected to the first switching unit 40 and the second switching unit 50. The output side is connected to the plurality of peripheral equipment connection ports 30. The power converter 60 is a DC power converter (DC to DC voltage converter) to convert the voltage level. In the embodiment, the DC power converter is a DC buck and boost convertor.

The temperature sensor 70 is disposed in the docking device to sense temperature in the docking device to output a voltage signal. The voltage signal represents a real temperature value T.

The processor 80 is a controlling center of the docking device. The processor 80 controls the first connection port 10, the second connection port 20 and each peripheral equipment connection port 30 coordinately according to USB-C power delivery protocol, controls the first switching unit 40 and the second switching unit 50 to be switched on or switched off, and initializes the power converter 60.

Figure 2A:
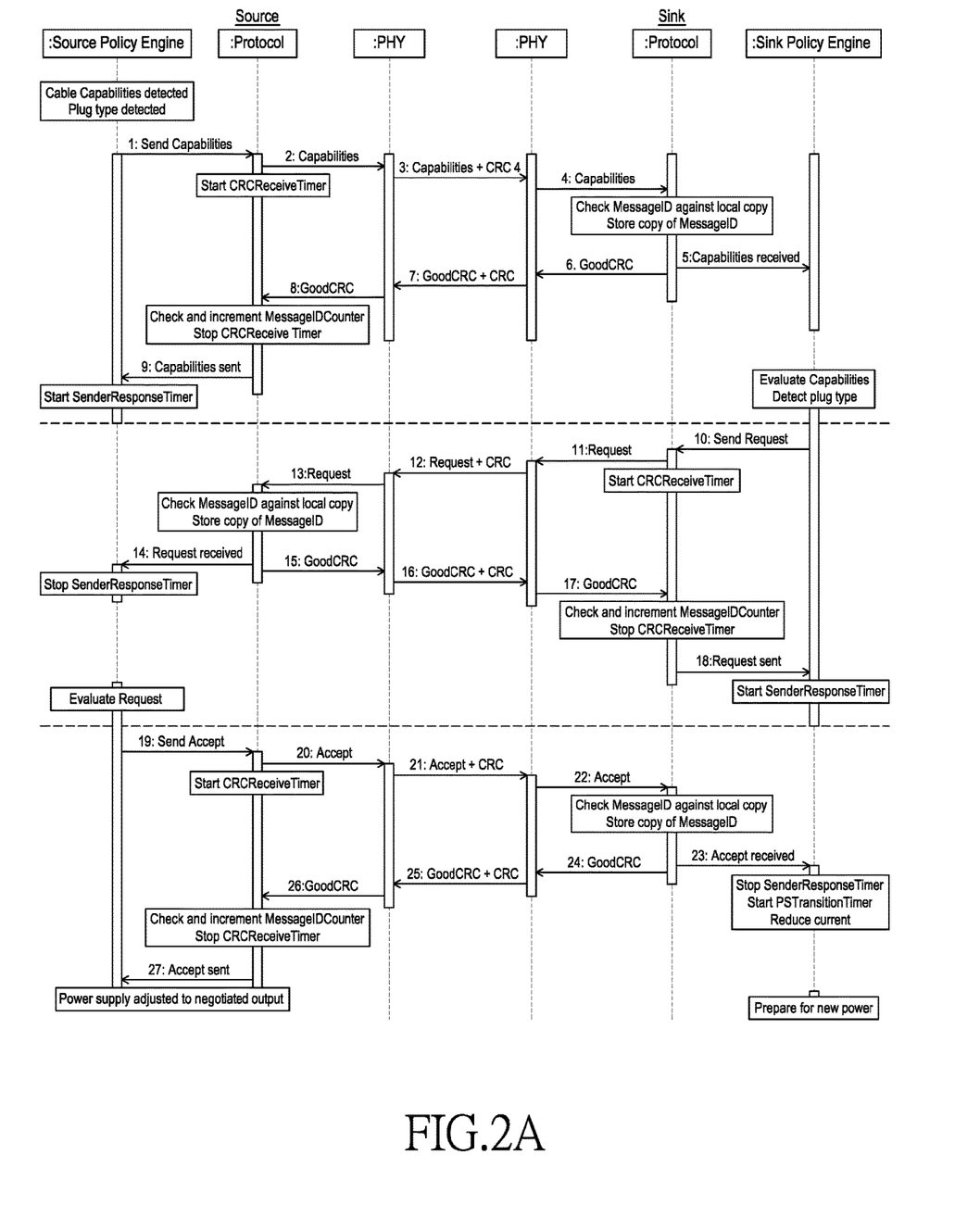
FIG. 2A is the diagram of successful Fixed, variable or battery power Negotiation of the Universal Serial Bus Power Delivery Specification.

Please refer to FIG. 2A. FIG. 2A is the diagram of successful Fixed, variable or battery power Negotiation of the Universal Serial Bus Power Delivery Specification. FIG. 2A discloses that the Cable Capabilities or Plug Type are detected if these are not already known. Policy Engine directs the Protocol Layer to send a Source_Capabilities Message that represents the power supply's present capabilities. Protocol Layer creates the Message and passes to Physical Layer. Starts CRCReceiveTimer. Physical Layer appends CRC and sends the Source_Capabilities Message. Physical Layer receives the Source_Capabilities Message and checks the CRC to verify the Message. Physical Layer removes the CRC and forwards the Source_Capabilities Message to the Protocol Layer. Protocol Layer checks the MessageID in the incoming Message is different from the previously stored value and then stores a copy of the new value. The Protocol Layer forwards the received Source_Capabilities Message information to the Policy Engine that consumes it. Protocol Layer generates a GoodCRC Message and passes it Physical Layer. Physical Layer receives the GoodCRC Message and checks the CRC to verify the Message. Physical Layer appends CRC and sends the GoodCRC Message. Physical Layer removes the CRC and forwards the GoodCRC Message to the Protocol Layer. Protocol Layer verifies and increments the MessageIDCounter and stops CRCReceiveTimer. Protocol Layer informs the Policy Engine that the Source_Capabilities Message was successfully sent. Policy Engine starts SenderResponseTimer. Policy Engine evaluates the Source_Capabilities Message sent by the Source, detects the plug type if this is necessary (see Section 4.4) and selects which power it would like. It tells the Protocol Layer to form the data (e.g. Power Data Object) that represents its Request into a Message. Policy engine directs the protocol layer to send a source_capabilities message that represents the power supply's present capabilities. Protocol Layer creates the Message and passes to Physical Layer. Starts CRCReceiveTimer. Protocol Layer creates the Request Message and passes to Physical Layer. Starts CRCReceiveTimer. Physical Layer receives the Request Message and compares the CRC it calculated with the one sent to verify the Message. Physical Layer appends a CRC and sends the Request Message. Physical Layer removes the CRC and forwards the Request Message to the Protocol Layer. Protocol Layer checks the MessageID in the incoming Message is different from the previously stored value and then stores a copy of the new value. The Protocol Layer passes the Request information to the Policy Engine. Policy Engine stops SenderResponseTimer. The Protocol Layer generates a GoodCRC Message and passes it to its Physical Layer. Physical Layer appends CRC and sends the Message. Physical Layer receives the Message and compares the CRC it calculated with the one sent to verify the Message. Physical Layer forwards the GoodCRC Message to the Protocol Layer. The protocol Layer verifies and increments the MessageIDCounter. It informs the Policy Engine that the Request Message was successfully sent. The Protocol Layer stops the CRCReceiveTimer. The Policy Engine starts SenderResponseTimer. Policy Engine evaluates the Request Message sent by the Sink and decides if it can meet the request. It tells the Protocol Layer to form an Accept Message. The Protocol Layer forms the Accept Message that is passed to the Physical Layer and starts the CRCReceiveTimer. Physical Layer appends CRC and sends the Accept Message. Physical Layer receives the Message and compares the CRC it calculated with the one sent to verify the Message. Physical Layer forwards the Accept Message to the Protocol Layer. Protocol Layer checks the MessageID in the incoming Message is different from the previously stored value and then stores a copy of the new value. Protocol Layer informs the Policy Engine that Accept Message has been received. The Policy Engine stops SenderResponseTimer, starts the PSTransitionTimer and reduces its current draw. The Device Policy Manager prepares the Power supply for transition to the new power level. The Protocol Layer generates a GoodCRC Message and passes it to its Physical Layer. Physical Layer receives the Message and compares the CRC it calculated with the one sent to verify the Message. Physical Layer appends CRC and sends the Message. Physical Layer forwards the GoodCRC Message to the Protocol Layer. The Protocol Layer verifies and increments the MessageIDCounter and stops the CRCReceiveTimer. The Protocol Layer informs the Policy Engine that Accept Message was successfully sent. Ultimately, power supply adjusts its output to the negotiated value.

Figure 2B:
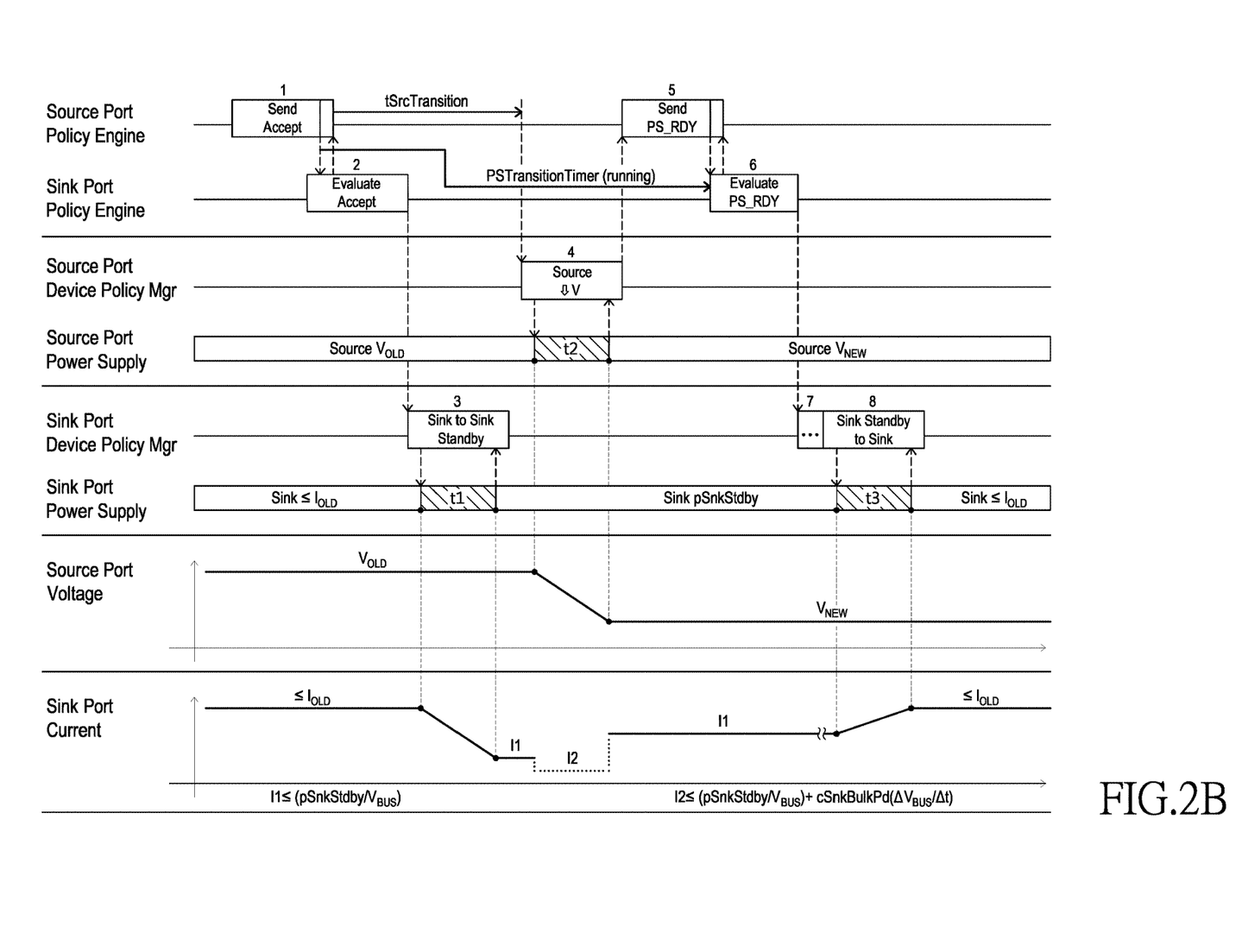
FIG. 2B is the transition diagram for decreasing the voltage of the Universal Serial Bus Power Delivery Specification.

Please refer to FIG. 2B. FIG. 2B is the transition diagram for decreasing the voltage of the Universal Serial Bus Power Delivery Specification. FIG. 2B discloses that the interaction of the system policy, device policy, and power supply that shall be followed when decreasing the voltage.

Figure 2C:
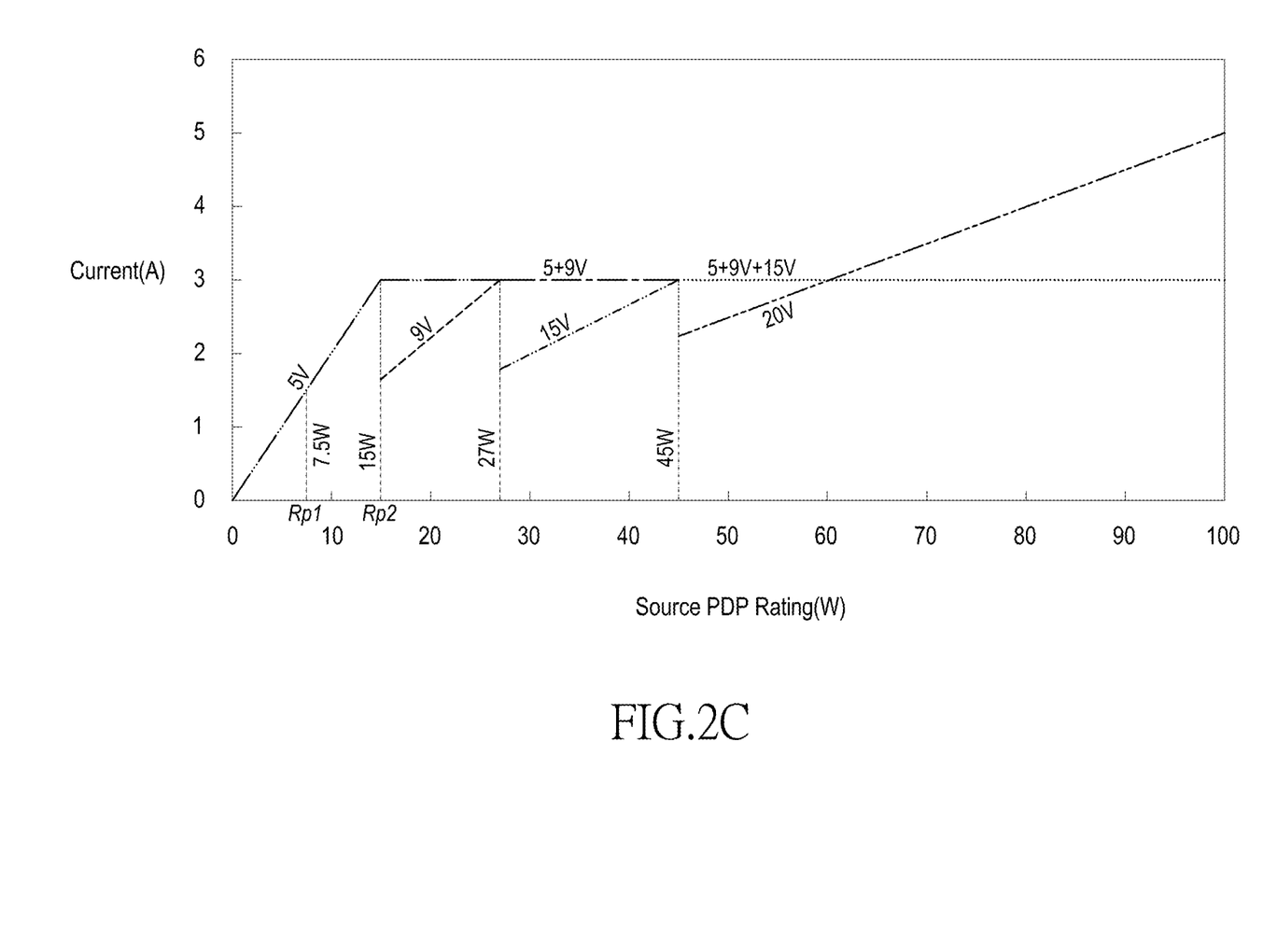
FIG. 2C is the diagram illustrating the minimum current that a source shall support at each voltage for a given PDP rating.

Please refer to FIG. 2C. FIG. 2C is the diagram illustrating the minimum current that a source shall support at each voltage for a given PDP rating. Not illustrated are that currents higher than 3 Ampere (A) are allowed to be offered up to a limit of 5 A given that a 5 A cable is detected by the source and the voltage times current remains within the source PDP Rating.

The aforementioned descriptions related to FIG. 2A, FIG. 2B, and FIG. 2C refer to the page 265 (Transition Diagram for Decreasing the Voltage), the page 318 (Successful Fixed, Variable or Battery Power Negotiation), and the page 556 (source power rule illustration) of the Universal Serial Bus Power Delivery Specification (revision 3.0, version 1.2 and release date: 21 Jun. 2018).

As mentioned above, since the first connection port 10 and the second connection port 20 are a USB-C connection port, for being connected to the host 100 and the external power 200 respectively, the output voltage of the host 100 and the output voltage of the external power 200 can be adjusted when the host 100 is connected to the first connection port 10 and the external power 200 is connected to the second connection port 20.

Figure 3:
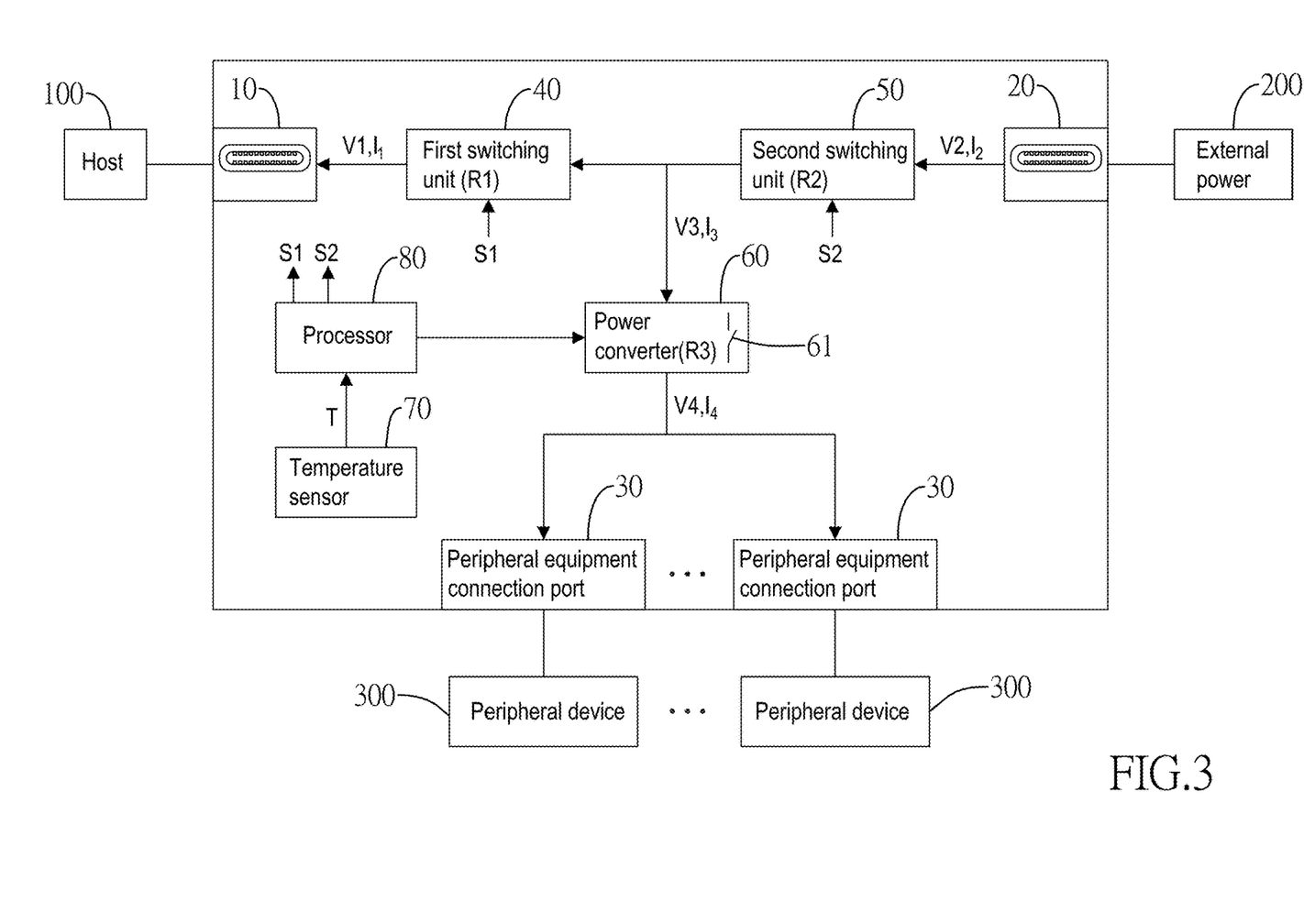
FIG. 3 is the operating schematic diagram while the docking device of the invention is charging.

Please refer to FIG. 3. The invention provides a charging function when the first connection port 10 is connected to the host 100 and the second connection port 20 is connected to an external power 200. The processor 80 outputs a first controlling signal S1 to conduct the first switching unit 40, and outputs a second controlling signal S2 to conduct the second switching unit 50. The processor 80 commands the external power 200 not only to provide power to the first connection port 10 via the second connection port 20 so as to charge the host 100 but also to provide power to the at least one peripheral equipment connection port 30 to charge each peripheral device 300. The processor 80 determines an appropriate charging mode according to the real temperature value T sensed by the temperature sensor 70. The details are described as below.

When the docking device is initiated, the processor 80 firstly performs a normal charging mode. The processor 80 determines whether the real temperature value T sensed by the temperature sensor 70 is less than a predetermined upper temperature threshold T2 at all time; if yes, the processor 80 persistently performs the normal charging mode.

[Normal Charging Mode]

The processor 80 first determines the level of the host voltage V1 which the first connection port 10 desires. The host voltage V1 is determined by a rated voltage which the host 100 desires. For instance, the host 100 is a notebook, desiring the rated charging voltage of 20V; therefore, the host voltage V1 is 20V. After determining the host voltage V1, the processor 80 requests the second connection port 20 to provide an input voltage V2 equal to the host voltage V1 (V2=V1) whereby the host 100 can be charged. Because both the first connection port 10 and the second connection port 20 are the USB-C connection port, the tolerance for the maximum power of the two connection ports is 100 W (20V/5 A) according to USB-C power delivery protocol. Each USB-C connection port can support to transmit voltages including 5V, 9V, 15V or 20V and so on. Hence, the docking device can satisfy all the charging demands since the power which the host 100 desires is less than 100 W.

The input voltage V2 is provided to the host 100, and further outputted to each peripheral equipment connection port 30 via the power converter 60 after converted. For convenience to describe, the voltage received by the input side of the power converter 60 represents an input side voltage V3. The input side voltage V3 is equal to the input voltage V2. The voltage which each peripheral equipment connection port 30 desires is a peripheral device voltage V4. The peripheral device voltage V4 is usually not equal to the host voltage V1 (V4≠V1). For example, if the peripheral device 300 is adapted to the USB peripheral device of 5V, the peripheral device voltage V4 which each peripheral equipment connection port 30 desires is 5V, which is less than the host voltage V1. Since the power converter 60 needs to be initialized to convert the voltage level, the processor 80 drives the power converter 60 to buck the higher input side voltage V3 to the peripheral device voltage V4 so as to output the peripheral device voltage V4 to each peripheral equipment connection port 30.

According to the above descriptions of the circuit operation, the power loss PL1 in the normal charging mode of the invention can be expressed by the following formula:

$$PL1 = I_1^2 \times R1 + I_2^2 \times R2 + (V3 \times I_3 \times Ef) \tag{1}$$

wherein $I_1$ represents the current through the first switching unit 40, $I_2$ represents the current through the second switching unit 50, 13 represents the current through the power converter 60 ($I_3 = I_2 - I_1$); R1 represents the equivalent resistance while the first switching unit 40 is conducted, R2 represents the equivalent resistance while the second switching unit 50 is conducted, and Ef represents a converting loss rate of the power converter 60.

While the power converter 60 is operating, the operating temperature of the docking device will gradually rise. Once the processor 80 determines that the real temperature value T sensed by the temperature sensor 70 is greater than or equal to an upper temperature threshold T2, the processor 80 will perform a cooling charging mode.

[Cooling Charging Mode]

The processor 80 requests that the input voltage V2 inputted by the second connection port 20 is equal to the peripheral device voltage V4 provided to the peripheral equipment connection port 30 (V2=V4). The same voltage as the input voltage V2 is provided to the first connection port 10. Because the input side voltage V3 received by the input side of the power converter 60 is equal to the peripheral device voltage V4, the input side voltage V3 is directly transmitted to the peripheral equipment connection port 30. The input side voltage V3 is not converted via the power converter 60. Therefore, there is no converting loss rate. For utilizing the input side voltage V3 as the peripheral device voltage V4, a bypass switch 61 can be provided to transmit the input side voltage V3 to be the peripheral device voltage V4. Consequently, the power loss PL1 in the cooling charging mode of the invention can be expressed by the following formula:

$$PL2 = I_1^2 \times R1 + I_2^2 \times R2 + I_3^2 \times R3 \tag{2}$$

wherein R3 represents the equivalent resistance while the power converter 60 is conducted.

The following data are provided by comparing the difference with power loss PL1 in the above normal charging mode and power loss PL2 in the cooling charging mode. The equivalent resistance R1=R2=R3=10 mΩ, Ef=10%, and the peripheral device 300 utilizes a power source of the voltage of 5V and the current of 2.4 A.

Each voltage and each current in the normal charging mode is:

| host voltage<br>V 1 = 20 V | input voltage<br>V 2 = 20 V | input side<br>voltage V 3 = 20 V | peripheral device<br>voltage V 4 = 5 V |
|---|---|---|---|
| $I_1$ = 3 A | $I_2$ = 5 A | $I_3$ = 2.4 A | / |

Substituting the above data to formula (1) to calculate power loss PL1:

$$PL1=3^2\times0.01+2.4^2\times0.01+(20\times2.4\times0.1)=4.95 \text{ W}$$

Furthermore, each voltage and each current in the cooling charging mode are:

| host voltage<br>V 1 = 5 V | input voltage<br>V 2 = 5 V | Input side<br>voltage V 3 = 5 V | peripheral device<br>voltage V 4 = 5 V |
|---|---|---|---|
| $I_1$ = 0.6 A | $I_2$ = 3 A | $I_3$ = 2.4 A | / |

Substituting the above data to formula (2) to calculate power loss PL2:

$$PL2=0.6^2\times0.01+3^2\times0.01+2.4^2\times0.01=0.15 \text{ W}$$

According to the result, while the real temperature value T is greater than or equal to the upper temperature threshold T2, the power converter 60 does not convert the voltage in the cooling charging mode. Therefore, the docking device can significantly reduce power loss, such as PL2=0.15 W. When the power loss is significantly reduced, heat generated by the docking device is reduced subsequently, temperature in the docking device can be gradually lowered, and overheating in the docking device can be efficiently mitigated.

Figure 4:
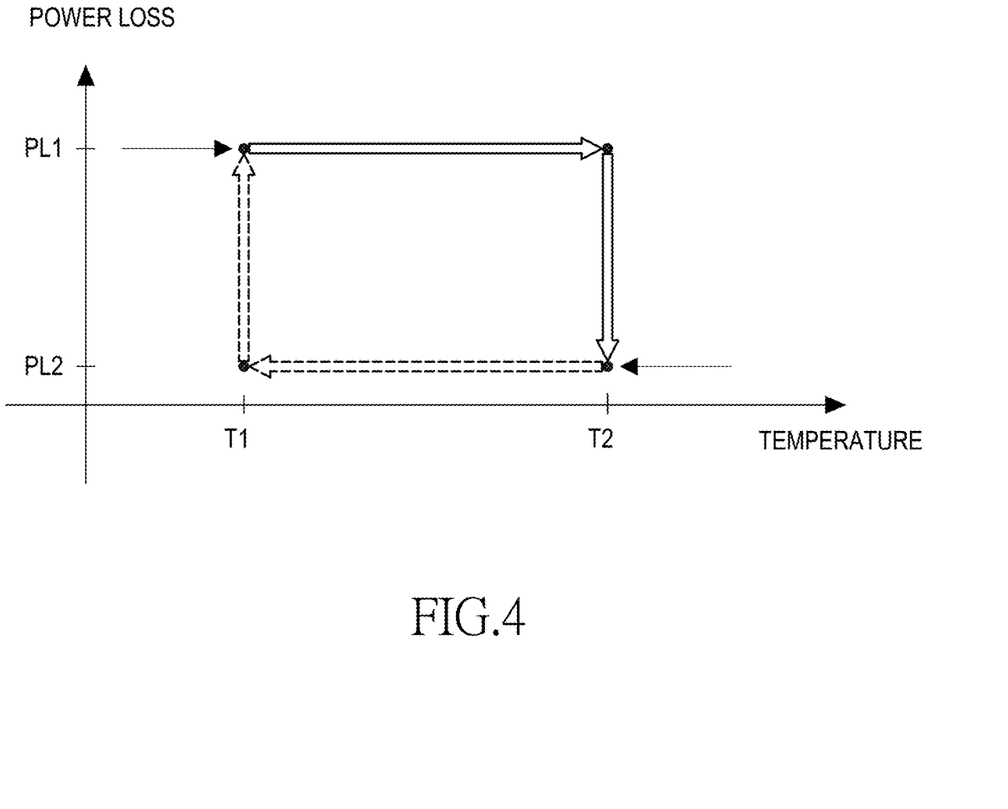
FIG. 4 is the circular schematic diagram for the normal charging mode and the cooling charging mode of the invention.

When the processor 80 determines that the temperature is gradually decreased to the lower temperature threshold T1, the processor 80 performs the normal charging mode again. As shown in FIG. 4, the device operates between the normal charging mode and the cooling charging mode with a circular loop. The modes are switched according to the lower temperature threshold T1 and the upper temperature threshold T2, which are predetermined according to the demand of the docking device. For instance, the lower temperature threshold T1 can be selected from the temperature values between 40~45° C., and the upper temperature threshold T2 can be selected from the temperature values between 50~60° C.

Figure 5:
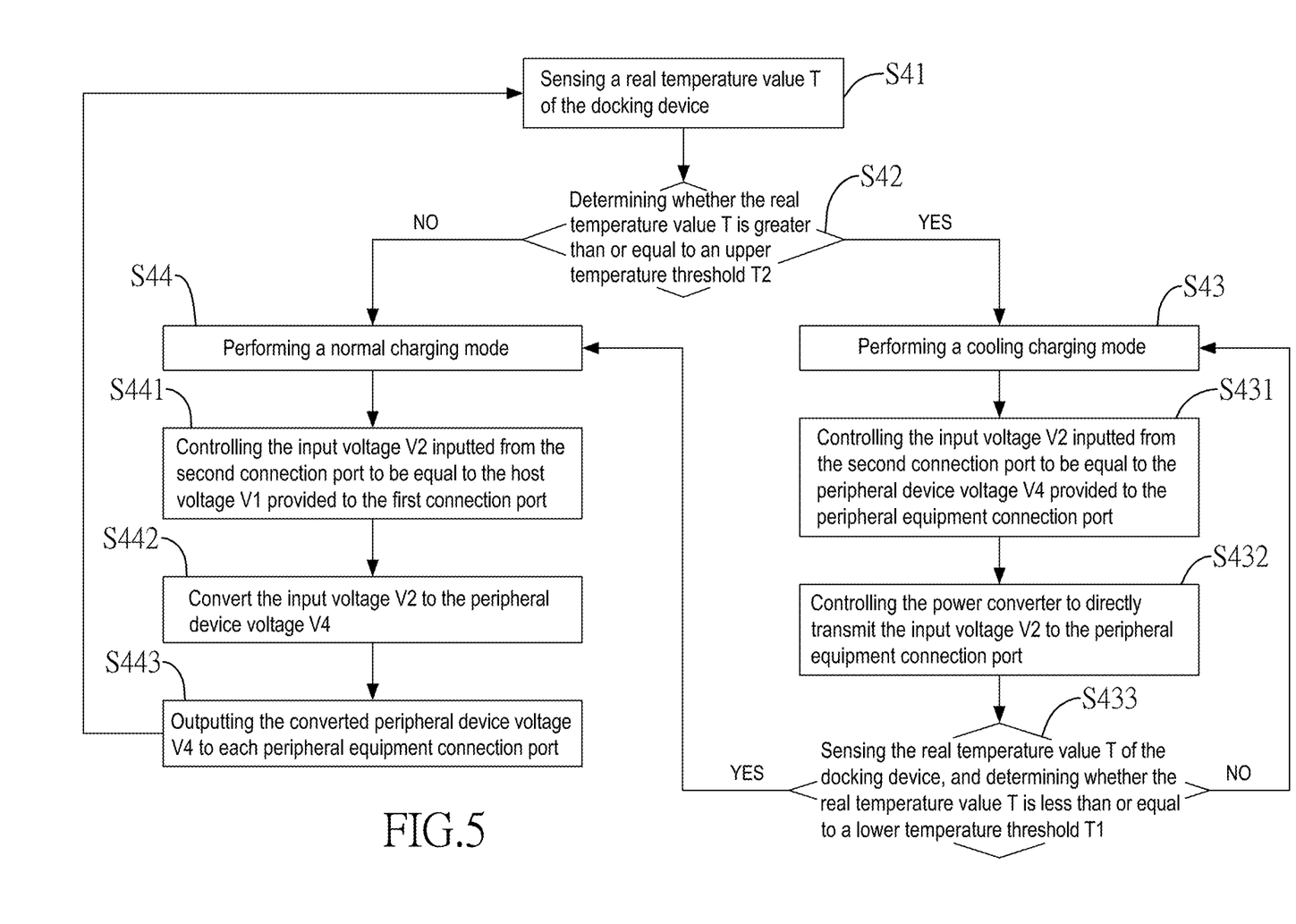
FIG. 5 is the flow chart of the method of the invention.

Please refer to FIG. 5. According to the aforementioned descriptions of the circuit operation, the charging management method performed by the docking device of the invention includes the following steps:

S41: sensing a real temperature value T of the docking device;

S42: determining whether the real temperature value T is greater than or equal to an upper temperature threshold T2;

S43, S44: while the real temperature value T is greater than or equal to the upper temperature threshold T2, performing a cooling charging mode (S43), otherwise performing a normal charging mode (S44);

wherein, the step S43 of performing the cooling charging mode includes the following steps:

S431: controlling the input voltage V2 inputted from the second connection port 20 to be equal to the peripheral device voltage V4 provided to the peripheral equipment connection port 30;

S432: controlling the power converter 60 to directly transmit the input voltage V2 to the peripheral equipment connection port 30;

S433: sensing the real temperature value T of the docking device, and determining whether the real temperature value T is less than or equal to a lower temperature threshold T1, if not, persistently performing the cooling charging mode S43, if yes, performing the normal charging mode S44;

wherein the step S44 of performing the normal charging mode includes the following steps:

S441: controlling the input voltage V2 inputted from the second connection port 20 to be equal to the host voltage V1 provided to the first connection port 10, and to output to the first connection port 10;

S442: initializing the power converter 60 to convert the input voltage V2 to the peripheral device voltage V4 provided to the peripheral equipment connection port 30, wherein the input voltage V2 is greater than the peripheral device voltage V4;

S443: outputting the converted peripheral device voltage V4 to each peripheral equipment connection port 30 by the power converter 60, and returning to perform the step S41.

In summary, the docking device includes the temperature sensor 70 to sense a real temperature value T in the docking device, and determines whether the real temperature value T is greater than an upper temperature threshold T2. When the real temperature value T is greater than the upper temperature threshold T2, the docking device performs a cooling charging mode. In the cooling charging mode, the input voltage V2 does not need to be converted by the power converter 60, and the processor 80 of the docking device controls the input voltage V2 to be equal to the peripheral device voltage V4 so as to avoid the conversion loss generated by the power converter 60. Therefore, the whole power loss generated by the docking device can be decreased so as to reduce the generation of heat. After that, the docking device can gradually cool down so that the real temperature value T can decrease to the predetermined temperature. Therefore, the docking device can avoid overheating caused by high temperature that damages the docking device. In addition, heat sinks do not need to be disposed in the docking device, thereby reducing size and cost of the docking device.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A docking device, including:
   a first connection port, connected to a host to provide a host voltage to the host; wherein the first connection port is a USB Type-C connector;
   a second connection port, connected to an external power to obtain an input voltage; wherein the second connection port is a USB Type-C connector;
   at least one peripheral equipment connection port, connected to a peripheral device to provide a peripheral device voltage to the peripheral device;
   a power converter, connected to the first connection port, the second connection port and the at least one peripheral equipment connection port;

a temperature sensor, sensing a temperature in the docking device to output a real temperature value;

a processor, controlling the first connection port, the second connection port and the at least one peripheral equipment connection port coordinately according to USB-C power delivery protocol;

wherein the processor receives the real temperature value to perform a normal charging mode or a cooling charging mode according to the real temperature value; when the real temperature value is greater than or equal to an upper temperature threshold, the processor performs the cooling charging mode and requests the input voltage of the second connection port to be equal to the peripheral device voltage and controls the input voltage to be transmitted to the at least one peripheral equipment connection port via the power converter.

2. The docking device as claimed in claim 1, wherein when the processor performs the cooling charging mode, the host voltage provided by the first connection port is equal to the input voltage of the second connection port.

3. The docking device as claimed in claim 2, wherein during the cooling charging mode, when the processor determines the real temperature value reaches a lower temperature threshold, the processor switches to perform the normal charging mode;

in the normal charging mode, the processor requests the input voltage of the second connection port to be equal to a rated voltage the host desires, and the input voltage to be shifted via the power converter to generate the peripheral device voltage; and the power converter outputs the peripheral device voltage to the at least one peripheral equipment connection port.

4. The docking device as claimed in claim 1, wherein the power converter is connected to the first connection port via a first switching unit, the power converter is connected to the second connection port via a second switching unit, and the processor controls the first switching unit and the second switching unit to be switched on or switched off.

5. The docking device as claimed in claim 2, wherein the power converter is connected to the first connection port via a first switching unit, the power converter is connected to the second connection port via a second switching unit, and the processor controls the first switching unit and the second switching unit to be switched on or switched off.

6. The docking device as claimed in claim 3, wherein the power converter is connected to the first connection port via a first switching unit, the power converter is connected to the second connection port via a second switching unit, and the processor controls the first switching unit and the second switching unit to be switched on or switched off.

7. The docking device as claimed in claim 4, wherein during the cooling charging mode, the input voltage of the second connection port is transmitted to the at least one peripheral equipment connection port via a bypass switch.

8. The docking device as claimed in claim 5, wherein during the cooling charging mode, the input voltage of the second connection port is transmitted to the at least one peripheral equipment connection port via a bypass switch.

9. The docking device as claimed in claim 6, wherein during the cooling charging mode, the input voltage of the second connection port is transmitted to the at least one peripheral equipment connection port via a bypass switch.

10. The docking device as claimed in claim 9, wherein the power converter is a DC buck and boost convertor.

11. A charging management method for a docking device, including:

sensing a real temperature value of the docking device;

determining whether the real temperature value is greater than or equal to an upper temperature threshold;

when the real temperature value is greater than or equal to the upper temperature threshold, a processor performs a cooling charging mode, otherwise, the processor performs a normal charging mode, wherein the cooling charging mode further includes following steps:

controlling an input voltage of a second connection port of the docking device to be equal to a peripheral device voltage provided to a peripheral equipment connection port, wherein the second connection port is a USB Type-C connector connected to an external power, and the peripheral equipment connection port is connected to a peripheral device;

controlling a power converter of the docking device to transmit the input voltage to the peripheral equipment connection port; and sensing the real temperature value of the docking device and determining whether the real temperature value is less than or equal to a lower temperature threshold, if not, continuously performing the cooling charging mode; if yes, performing the normal charging mode.

12. The charging management method for the docking device as claimed in claim 11, wherein the step for performing the normal charging mode further includes:

controlling the input voltage of the second connection port to be equal to a host voltage provided to a first connection port of the docking device, wherein the first connection port is a USB Type-C connector connected to a host;

initializing the power converter to convert the input voltage as a peripheral device voltage provided to the peripheral equipment connection port, wherein the input voltage is greater than the peripheral device voltage; and outputting the peripheral device voltage to the peripheral equipment connection port by the power converter.

13. The charging management method for the docking device as claimed in claim 11, wherein in the cooling charging mode, the input voltage of the second connection port is transmitted to the peripheral equipment connection port via a bypass switch.

14. The charging management method for the docking device as claimed in claim 12, wherein in the cooling charging mode, the input voltage of the second connection port is transmitted to the peripheral equipment connection port via a bypass switch.

15. The charging management method for the docking device as claimed in claim 13, wherein the first connection port, the second connection port, and the peripheral equipment connection port are controlled coordinately according to USB-C power delivery protocol.

16. The charging management method for the docking device as claimed in claim 14, wherein the first connection port, the second connection port, and the peripheral equipment connection port are controlled coordinately according to USB-C power delivery protocol.

* * * * *